US012499471B2

United States Patent
Li et al.

(10) Patent No.: US 12,499,471 B2
(45) Date of Patent: Dec. 16, 2025

(54) AUTOMATICALLY GENERATING A RETAILER-SPECIFIC BRAND PAGE BASED ON A MACHINE LEARNING PREDICTION OF ITEM AVAILABILITY

(71) Applicant: Maplebear Inc., San Francisco, CA (US)

(72) Inventors: Ming Li, Seattle, WA (US); Natalie Binns, San Francisco, CA (US); Dmytro Solomadin, Toronto (CA); Zhiyi Fan, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/137,389

(22) Filed: Apr. 20, 2023

(65) Prior Publication Data

US 2024/0354812 A1 Oct. 24, 2024

(51) Int. Cl.
*G06Q 30/0241* (2023.01)
(52) U.S. Cl.
CPC .................. *G06Q 30/0276* (2013.01)
(58) Field of Classification Search
CPC .................................................. G06Q 30/0276
See application file for complete search history.

(56) References Cited

U.S. PATENT DOCUMENTS

| | | | | |
|---|---|---|---|---|
| 9,672,554 | B2* | 6/2017 | Dumon | G06Q 30/0603 |
| 2018/0308030 | A1* | 10/2018 | Nemati | G06Q 10/06314 |
| 2020/0027137 | A1* | 1/2020 | Miller | G06Q 30/0267 |
| 2022/0374805 | A1* | 11/2022 | Zhang | G06Q 30/0631 |
| 2022/0383624 | A1* | 12/2022 | Delbom | G06V 10/7747 |
| 2022/0391968 | A1* | 12/2022 | Roesbery | G06Q 30/0639 |
| 2023/0083724 | A1* | 3/2023 | Cella | G06Q 30/0206 |
| | | | | 705/28 |

* cited by examiner

*Primary Examiner* — Azam A Ansari
(74) *Attorney, Agent, or Firm* — Fenwick & West LLP

(57) ABSTRACT

An online system receives information identifying items associated with a brand, a hierarchical taxonomy of the items, and information identifying a retailer associated with the brand. The system applies a machine learning model to predict availabilities of the items at (a) retailer location(s) associated with the retailer, identifies items that are likely available at the retailer location(s), and groups the identified items into categories based on the taxonomy. The system computes an item score for each item based on its popularity, attributes, and/or attributes of a user. The system assigns items in each category to positions within a display unit associated with the category and computes a category score for each category based on the item scores. The system assigns display units associated with the categories to positions within a template based on the category score and generates a page associated with the brand and retailer based on the assignments.

20 Claims, 5 Drawing Sheets

AUTOMATICALLY GENERATING A RETAILER-SPECIFIC BRAND PAGE BASED ON A MACHINE LEARNING PREDICTION OF ITEM AVAILABILITY

BACKGROUND

Online systems, such as online concierge systems, may allow brands to create brand pages that are presented to users of the online systems. Brand pages allow brands to communicate with potential customers about products or services provided by the brands and also may allow customers to purchase the products or services. As such, a brand page is similar to a storefront exterior or a homepage and should communicate important information about a brand (e.g., its name, mission, what sets it apart from competitors, etc.), while being appealing, accessible, engaging, etc. This may be accomplished via various components of a brand page, such as a name and a logo identifying a brand, search fields or buttons for navigating the brand page, carousels or other display units for presenting products or services provided by the brand, etc.

But the process of creating brand pages may be difficult and inefficient for various reasons. For example, the creation of a draft of a brand page may include multiple time-consuming and cumbersome steps, such as designing a layout, which often requires specialized knowledge (e.g., about layouts and web design) and creating or selecting content to present in the layout (e.g., logos, products included in a catalog of products provided by a brand, etc.). In this example, once a draft of the brand page is created, it may be submitted to an online system to undergo a review process to ensure that it meets various criteria set by the online system, adding to the time required to create the brand page. Continuing with this example, if the draft of the brand page does not satisfy the criteria, it may have to be edited and resubmitted for review and this process may be repeated until the criteria are met, further adding to the amount of time required to create the brand page. As a result, entities associated with brands may become frustrated with the process of creating brand pages, especially if they have deadlines that are quickly approaching (e.g., for promoting new campaigns).

Moreover, a brand page for a specific retailer may not reflect the actual availability state of items for a brand at a given retail location because inventories change over time. Since a digital brand page is not linked to the real-world items at a retailer, the items on a brand page may not be accurate if the retailer is out of stock for a given item. This can lead to a poor user experience, as a user may attempt to purchase an item that is unavailable. Manual entry of item availability is not feasible, as there are too many items and too many retailers for a human to accomplish the task efficiently. Inventory tracking solutions often require hardware installation at a warehouse or retailer location, which can be costly and unlikely to be adopted widely. Accordingly, there is a need for brand page creation that accounts for an availability of an item without requiring expensive hardware installations at different retailer locations.

SUMMARY

In accordance with one or more aspects of the disclosure, an online system automatically generates a retailer-specific brand page. More specifically, an online system receives information identifying items associated with a brand and a hierarchical taxonomy of the items, in which the items are included in a catalog of items associated with the brand. The online system receives information identifying a retailer associated with the brand, in which at least one item associated with the brand is included among an inventory of the retailer. The online system then applies a machine learning model to a first set of attributes associated with each item included among the inventory of the retailer to predict an availability of each item at one or more retailer locations associated with the retailer and identifies a set of items associated with at least a threshold predicted availability at the retailer location(s). The online system groups the set of items into one or more item categories based at least in part on the hierarchical taxonomy of the items. For each item category, the online system computes an item score for each item included in the item category based at least in part on a measure of popularity of the item among users of the online system, a set of attributes associated with the item, and/or a set of attributes associated with a user of the online system. The online system also assigns one or more items included in each item category to one or more positions within a display unit associated with the corresponding item category based at least in part on the item score computed for each item. The online system further computes a category score for each item category based at least in part on the item score computed for each item included in the item category. The online system assigns one or more display units associated with the one or more item categories to one or more category positions within a template maintained by the online system based at least in part on the category score computed for each item category. The online system then generates a page associated with the brand and retailer based at least in part on the display unit(s) assigned to the category position(s) within the template and the item(s) assigned to the item position(s) within the display unit associated with each item category.

DETAILED DESCRIPTION

Figure 1:
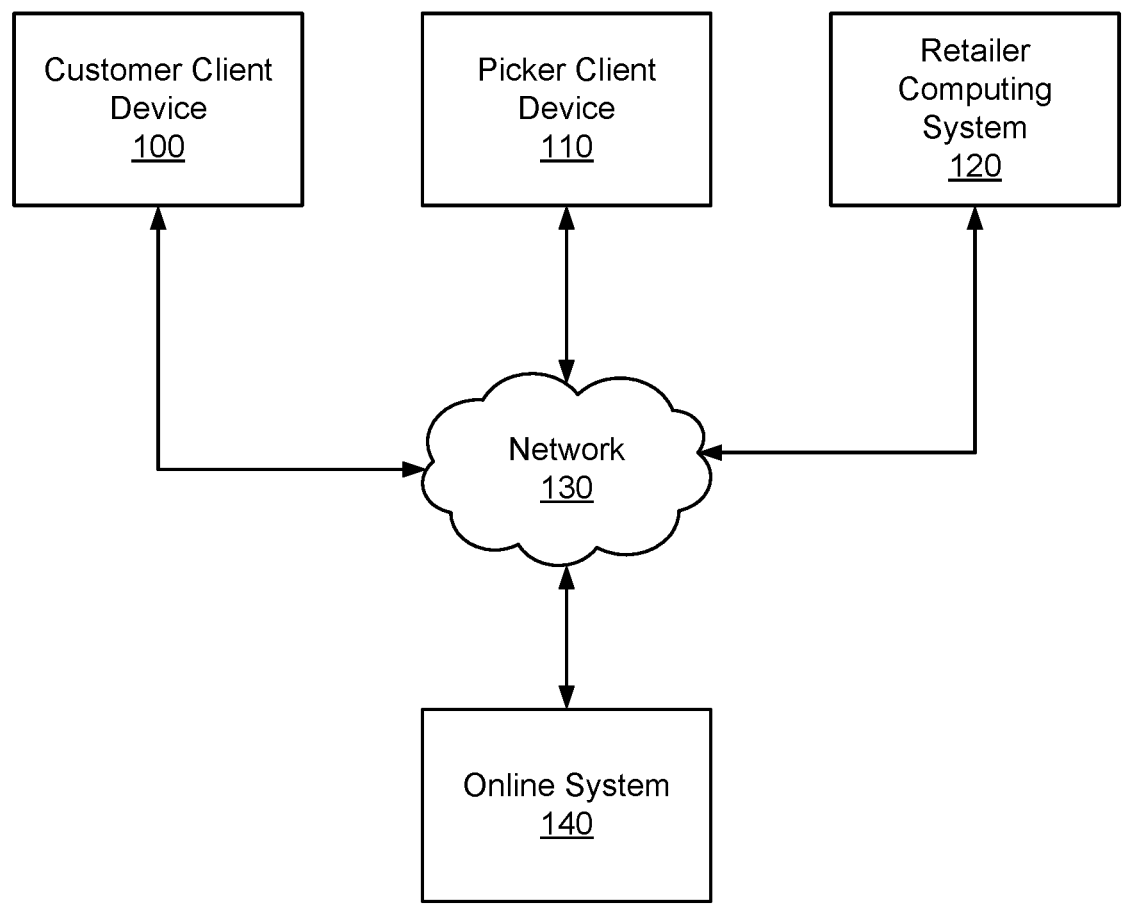
FIG. 1 illustrates an example system environment for an online system, in accordance with one or more embodiments.

FIG. 1 illustrates an example system environment for an online system 140, such as an online concierge system, in accordance with one or more embodiments. The system environment illustrated in FIG. 1 includes a customer client device 100, a picker client device 110, a retailer computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online system 140. Additionally, while one customer client device 100, picker client device 110, and retailer computing system 120 are illustrated in FIG. 1, any number of customers, pickers, and retailers may interact with the online system 140. As such, there may be more than one customer client device 100, picker client device 110, or retailer computing system 120.

The customer client device 100 is a client device through which a customer may interact with the picker client device 110, the retailer computing system 120, or the online system 140. The customer client device 100 can be a personal or mobile computing device, such as a smartphone, a tablet, a laptop computer, or a desktop computer. In some embodiments, the customer client device 100 executes a client application that uses an application programming interface (API) to communicate with the online system 140.

A customer uses the customer client device 100 to place an order with the online system 140. An order specifies a set of items to be delivered to the customer. An "item," as used herein, refers to a good or product that may be provided to the customer through the online system 140. The order may include item identifiers (e.g., a stock keeping unit or a price look-up code) for items to be delivered to the customer and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online system 140. The ordering interface may be part of a client application operating on the customer client device 100. The ordering interface allows the customer to search for items that are available through the online system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the items should be collected.

The customer client device 100 may receive additional content from the online system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a retailer location. The picker client device 110 presents the items that are included in the customer's order to the picker in a collection interface. The collection interface is a user interface that provides information to the picker identifying items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 provides instructions to a picker for delivering the items for a customer's order. For example, the picker client device 110 displays a delivery location from the order to the picker. The picker client device 110 also provides navigation instructions for the picker to travel from the retailer location to the delivery location. If a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the customer client device 100 for display to the customer such that the customer can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online system 140. Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online system 140. As used herein, a "retailer" is an entity that operates a "retailer location," which is a store, warehouse, or other building from which a picker can collect items. The retailer computing system 120 stores and provides item data to the online system 140 and may regularly update the online system 140 with updated item data. For example, the retailer computing system 120 may provide item data indicating which items (e.g., brands, types, etc.) are available at a retailer location and the quantities of those items. Additionally, the retailer computing system 120 may transmit updated item data to the online system 140 when an item is no longer available at the retailer location. Additionally, the retailer computing system 120 may provide the online system 140 with updated item prices, sales, or availabilities. Additionally, the retailer computing system 120 may receive payment information from the online system 140 for orders serviced by the online system 140. Alternatively, the retailer computing system 120 may provide payment to the online system 140 for some portion of the overall cost of a customer's order (e.g., as a commission).

The customer client device 100, the picker client device 110, the retailer computing system 120, and the online system 140 may communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 may be an online concierge system by which customers can order items to be provided to them by a picker from a retailer. The online system 140 receives orders from a customer client device 100 through the network 130. The online system 140 selects a picker to service the customer's order and transmits the order to a picker client device 110 associated with the picker. The picker collects the ordered items from a retailer location and delivers the ordered items to the customer. The online system 140 may charge a customer for the order and provide portions of the payment from the customer to the picker and the retailer. As an example, the online system 140 may allow a customer to order groceries from a grocery store retailer. The customer's order may specify which groceries they want delivered from the grocery store and the quantities of each of the groceries. The customer client device 100 transmits the customer's order to the online system 140 and the online system 140 selects a picker to travel to the grocery store retailer location to collect the groceries ordered by the customer. Once the picker has collected the groceries ordered by the customer, the picker delivers the groceries to a location transmitted to the picker client device 110 by the online system 140. The online system 140 is described in further detail below with regards to FIG. 2.

Figure 2:
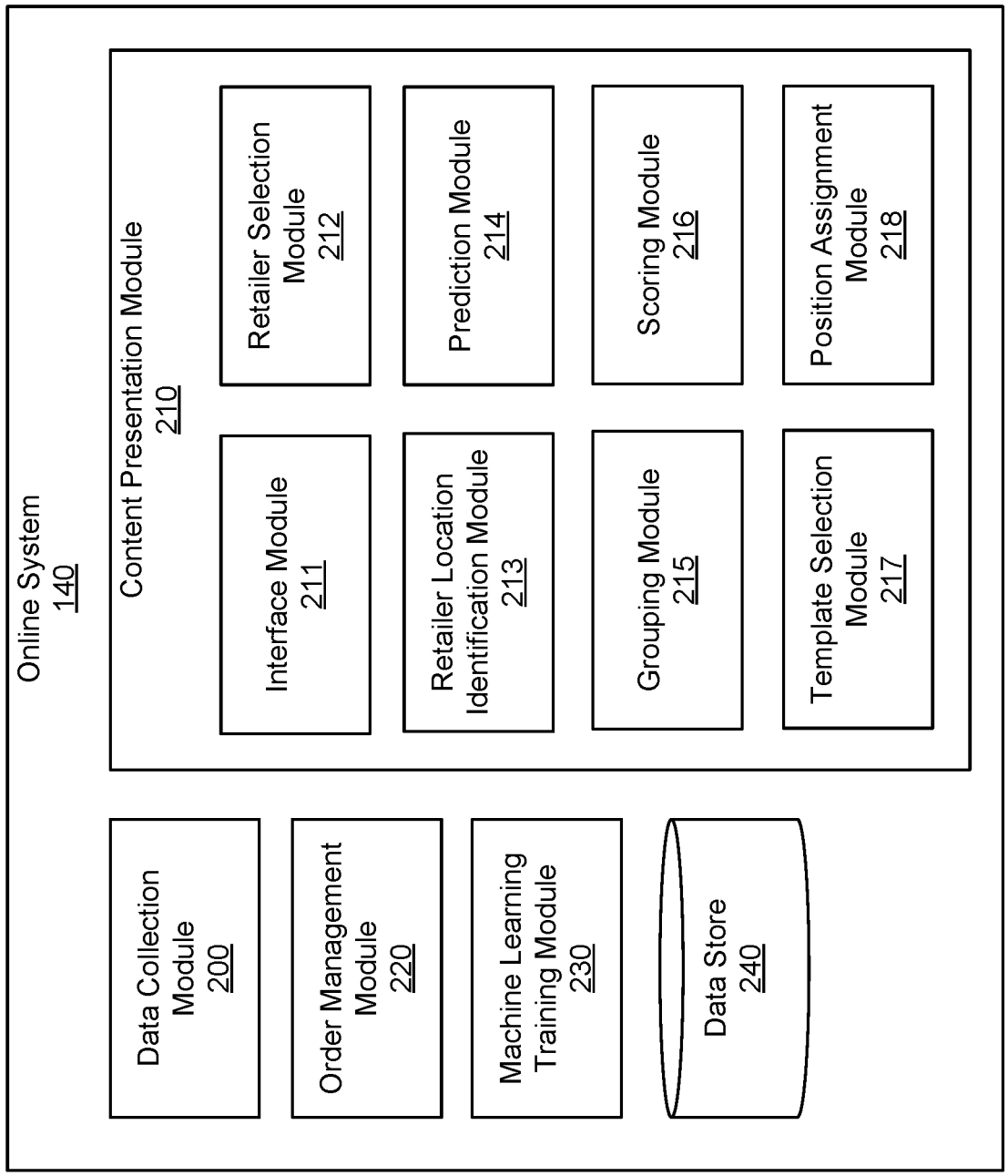
FIG. 2 illustrates an example system architecture for an online system, in accordance with one or more embodiments.

FIG. 2 illustrates an example system architecture for an online system 140, such as an online concierge system, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. The data collection module 200 may only collect data describing a user if the user has previously explicitly consented to the online system 140 collecting data describing the user. Additionally, the data collection module 200 may encrypt all data, including sensitive or personal data, describing users.

The data collection module 200 collects customer data, which is information or data that describe characteristics, attributes, or other types of information associated with a customer. Customer data may include a customer's name, address, shopping preferences, favorite items, favorite retailers, stored payment instruments, dietary preferences (e.g., vegetarian, gluten-free, etc.), and demographic information (e.g., age, gender, etc.). Customer data also may include historical information associated with a customer. For example, customer data may describe historical interaction information associated with a customer, such as a search or a browsing history of the customer, and historical order information associated with the customer, such as information describing previous orders placed by the customer. Customer data further may include information describing retailers (e.g., names, types, geographical locations of retailer locations operated by the retailers, etc.) and items (e.g., names, types, prices, etc.) with which a customer interacted (e.g., by searching for the items, clicking on them, adding them to a shopping list, etc.). Furthermore, customer data may include information associated with a customer that may be determined based on other customer data for the customer, such as a frequency with which the customer orders an item, an average number of items included in each order placed by the customer, or any other suitable types of information. The customer data also may include default settings established by a customer, such as a default retailer/retailer location, payment instrument, delivery location, or delivery timeframe. The data collection module 200 may collect the customer data from sensors on the customer client device 100 or based on a customer's interactions with the online system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the sizes, colors, weights, stock keeping units (SKUs), serial numbers, prices, item categories, brands, sales, discounts, qualities (e.g., freshness, ripeness, etc.), ingredients, materials, manufacturing locations, or any other suitable attributes of the items. The item data may further include purchasing rules associated with each item, if they exist. For example, age-restricted items such as alcohol and tobacco are flagged accordingly in the item data. Item data may also include information that is useful for predicting the availability of items at retailer locations. For example, for each item-retailer combination (a particular item at a particular retailer location), the item data may include a time that the item was last found, a time that the item was last not found (a picker looked for the item but could not find it), a time that the item was last delivered to the retailer location, a quantity of the item that was last delivered to the retailer location, the rate at which the item is found, or the popularity of the item. The data collection module 200 may collect item data from a retailer computing system 120, a picker client device 110, or a customer client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. In some embodiments, item categories may be broader in that the same item category may include item types that are related to a common theme, found in the same department, etc. Furthermore, in various embodiments, an item may be included in multiple categories. For example, organic strawberries may be included in an "organic strawberries" item category, a "strawberries" item category, an "organic fruit" item category, a "fruit" item category, an "organic produce" item category, and/or a "produce" item category. The item categories may be human-generated and human-populated with items. The item categories also may be generated automatically by the online system 140 (e.g., using a clustering algorithm).

The data collection module 200 also collects brand data, which is information or data associated with a brand. The data collection module 200 may receive brand data from an entity associated with a brand (e.g., a retailer computing system 120 associated with a retailer that offers items associated with the brand for purchase) or any other suitable source. Brand data may include a name of a brand, a logo associated with the brand, information associated with items associated with the brand, campaigns associated with the brand, images or videos associated with the brand, or any other suitable types of information associated with a brand. Brand data also may include a catalog of items that identifies items associated with a brand offered for purchase by one or more retailers. A catalog of items may be human-generated and human-populated with items (e.g., based on universal product codes (UPCs) associated with each brand). A catalog of items also may be generated by the data collection module 200 by querying item data stored in the data store 240 for items associated with the brand. For example, the data collection module 200 may query the data store 240 for items by a "brand" field to generate a catalog of items associated with each brand.

Items associated with a brand may be organized into a hierarchical taxonomy, in which different levels of the hierarchical taxonomy provide different levels of specificity about items included in the levels. In some embodiments, the data collection module 200 may determine a hierarchical taxonomy of items from a catalog of items associated with a brand. In such embodiments, the data collection module 200 may determine the hierarchical taxonomy by applying a trained classification model to the catalog of items to include different items in levels of the hierarchical taxonomy, such that specific items are associated with item categories corresponding to levels within the hierarchical taxonomy. Alternatively, the data collection module 200 may receive a hierarchical taxonomy of items from an entity associated with a brand (e.g., a retailer computing system 120 associated with a retailer that offers the items for purchase) or any other suitable source.

A hierarchical taxonomy of items associated with a brand may identify an item category and associate one or more specific items with the item category. For example, if an item category identifies "milk," a hierarchical taxonomy of items may associate identifiers of different milk items (e.g., milk having different attributes) with the item category. Thus, a hierarchical taxonomy of items maintains associations between an item category and specific items associated with a brand matching the item category. Furthermore, different levels of a hierarchical taxonomy of items may identify items with differing levels of specificity based on any suitable attribute or combination of attributes of the items. For example, different levels of a hierarchical taxonomy of items may specify different combinations of attributes of items, such that items in lower levels of the hierarchical taxonomy have a greater number of attributes, corresponding to greater specificity in an item category, while items in higher levels of the hierarchical taxonomy have a fewer number of attributes, corresponding to less specificity in an item category. In various embodiments, higher levels of a hierarchical taxonomy of items may include fewer details about items, such that greater numbers of items are included in higher levels (e.g., higher levels include a greater number of items satisfying a broader item category). Similarly, lower levels of a hierarchical taxonomy of items may include greater details about items, such that fewer numbers of items are included in the lower levels (e.g., lower levels include a fewer number of items satisfying a more specific item category). A hierarchical taxonomy of items may be maintained by the data collection module 200 and stored in the data store 240.

The data collection module 200 also collects picker data, which is information or data that describes characteristics of pickers. For example, the picker data for a picker may include the picker's name, the picker's location, how often the picker has serviced orders for the online system 140, a customer rating for the picker, the retailers from which the picker has collected items, or the picker's previous shopping history. Additionally, the picker data may include preferences expressed by the picker, such as their preferred retailers for collecting items, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. In this example, the content presentation module 210 then displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The content presentation module 210 also generates brand pages for display to customer client devices 100 associated with customers. A brand page is a page (e.g., a webpage or a profile page maintained by the online system 140) that is associated with a brand. A brand page may be a landing page to which objects (e.g., advertisements presented by the online system 140 or external websites) associated with a brand are linked. For example, a brand page may be linked to a result in a list of search results returned by a search engine or to details for an item associated with a brand presented by a social networking system. Furthermore, a brand page may allow customers to order items associated with a brand. For example, via a brand page, customers may add items associated with a brand to shopping lists or shopping carts and place orders including the items. A brand page also may be associated with a retailer. For example, a brand page may include items associated with a brand that are available for customers to purchase from one or more retailer locations operated by a retailer.

In some embodiments, the content presentation module 210 generates a brand page that may be presented to all customers, while in other embodiments, the content presentation module 210 generates a brand page that is specific to a customer. In embodiments in which the content presentation module 210 generates a brand page that is specific to a customer, the content presentation module 210 may generate the brand page in response to receiving a request from a customer client device 100 to access the brand page. For example, when a customer associated with a customer client device 100 interacts with an object (e.g., an advertisement presented by the online system 140 or an external website) associated with a brand, the online system 140 may receive a request from the customer client device 100 to access a brand page for the brand and the content presentation module 210 may then generate the brand page. The content presentation module 210 may generate a brand page using various components of the content presentation module 210. Components of the content presentation module 210 include: an interface module 211, a retailer selection module 212, a retailer location identification module 213, a prediction module 214, a grouping module 215, a scoring module 216, a template selection module 217, and a position assignment module 218, which are further described below.

The interface module 211 may maintain one or more templates stored in the data store 240 for generating brand pages. A template may be predesigned (e.g., with a color scheme, a theme, a layout, etc.) or preformatted for various types of data (e.g., text, images, or videos) to satisfy a set of criteria for brand pages set by the online system 140. A template may have a layout that includes placeholders in different areas of the template for various components of a brand page. Examples of such components include: a brand name, a brand logo, display units (e.g., carousels, grids, lists, etc. for presenting content including text, images, videos, etc.), or any other suitable types of components. For example, a template may include placeholders for a name of a brand and a logo for the brand near the top of the template, as well as placeholders for display units further down the template. In some embodiments, the interface module 211 may modify or update a template based on various types of information received by the online system 140. For example, the interface module 211 may update or modify a template based on information received by the data collection module 200 describing interactions (or lack thereof) by customers to whom brand pages generated using the template were presented. As an additional example, the interface module 211 may update or modify a template based on inputs to change a position of a placeholder, to change a format associated with a type of data, etc.

The interface module 211 also generates brand pages and sends them for display to customer client devices 100 associated with customers. The interface module 211 may generate a brand page based at least in part on one or more display units assigned to one or more "category positions" within a template and one or more items assigned to one or more "item positions" within a display unit associated with each item category, as further described below. A category position is a placeholder within a template in which items included in an item category associated with a display unit assigned to the category position may be presented, while an item position is a placeholder within a display unit in which an item included in an item category associated with the display unit may be presented. For example, suppose that each of multiple display units have been assigned to a category position within a template maintained by the interface module 211, in which each display unit is associated with an item category and that each item included in each item category has been assigned to an item position within a display unit associated with the item category. In this example, the interface module 211 may generate a brand page such that each category position of the template is populated with a display unit to which it was assigned and each item position within a display unit is populated with an item to which it was assigned.

In various embodiments, the interface module 211 may generate multiple brand pages for a brand, in which each brand page is associated with a different retailer. In such embodiments, the interface module 211 may select a brand page to send for display to a customer client device 100 based on various types of information, such as information included in a request to access the brand page, information associated with each retailer, customer data associated with a customer to whom the brand page is to be presented, etc. For example, suppose that the online system 140 receives a request from a customer client device 100 to access a brand page for a brand when a customer associated with the customer client device 100 interacts with an object (e.g., an advertisement presented by the online system 140 or an external website) associated with the brand. In this example, based on information identifying the brand and a retailer associated with the object included in the request, the interface module 211 may select a brand page for the brand associated with the retailer and send it for display to the customer client device 100. Alternatively, in the above example, the interface module 211 may access information describing a set of favorite retailers associated with the customer and select a brand page for the brand associated with a retailer included among the set of favorite retailers and send it for display to the customer client device 100. As yet another example, based on geographical locations associated with retailer locations operated by each retailer associated with a brand page and a delivery location associated with a customer to whom the brand page is to be presented, the interface module 211 may select a brand page associated with a retailer that operates a retailer location closest to the delivery location and send it for display to the customer client device 100.

In some embodiments, the retailer selection module 212 may select a retailer associated with a brand. The retailer selection module 212 may do so based on predicted likelihoods of conversion for items included among inventories of retailers associated with the brand, predicted availabilities of items included among inventories of the retailers, information associated with a customer to whom a brand page for the brand is to be presented, or any other suitable types of information. For example, for a customer to whom a brand page for a brand is to be presented, if an average of the likelihoods that the customer will order items associated with the brand from a first retailer is higher than an average of the likelihoods that the customer will order items associated with the brand from a second retailer, the retailer selection module 212 may select the first retailer instead of the second retailer. As an additional example, if a greater number or percentage of items associated with a brand are predicted to be available at retailer locations associated with a first retailer than at retailer locations associated with a second retailer, the retailer selection module 212 may select the first retailer instead of the second retailer. In the above example, the retailer locations may be selected based on a geographical location associated with a customer to whom a brand page for the brand is to be presented (e.g., the customer's address or a default delivery location for orders placed by the customer), such that the retailer locations are within a threshold distance of the geographical location or in the same geographical region as the geographical location. As another example, based on historical order information for a customer to whom a brand page for a brand is to be presented, the retailer selection module 212 may select a retailer associated with the brand from which the customer previously ordered items associated with the brand. As yet another example, if a customer has requested to access a brand page for a brand by interacting with an object presented via a storefront associated with a retailer or has requested to access the brand page after adding items to a shopping cart or a shopping list associated with the retailer, the retailer selection module 212 may select the retailer instead of other retailers associated with the brand.

The retailer location identification module 213 identifies one or more retailer locations associated with a retailer. The retailer location identification module 213 may do so based at least in part on information identifying the retailer (e.g., received from the data collection module 200, the retailer selection module 212, in a request to access a brand page for a brand, etc.) and a geographical location associated with a customer. For example, suppose that a request is received from a customer client device 100 associated with a customer to access a brand page, in which the brand page is associated with a retailer. In this example, the retailer location identification module 213 may access customer data from the data store 240 describing a geographical location associated with the customer corresponding to the customer's address or a default delivery location for orders placed by the customer. Continuing with this example, based on the geographical location associated with the customer and information identifying the retailer included in the request, the retailer location identification module 213 may identify one or more retailer locations operated by the retailer within a threshold distance of the geographical location or in the same geographical region as the geographical location.

The prediction module 214 predicts availabilities of items at retailer locations. The prediction module 214 may predict an availability of an item at a retailer location based at least in part on information received from a retailer computing system 120 or item data stored in the data store 240. For example, based on information describing a time that an item was last found at a retailer location, a time that the item was last not found at the retailer location, a time that the item was last delivered to the retailer location, etc., the prediction module 214 may predict an availability of the item at the retailer location.

In some embodiments, the prediction module 214 may use the availability model described above to predict an availability of an item at a retailer location. In various embodiments, the availability model may be trained by the machine learning training module 230 based at least in part on historical information describing availabilities of items at a retailer location, as described below. The prediction module 214 may use the availability model by accessing the model and applying it to a set of attributes associated with an item. For example, the prediction module 214 may apply the availability model to attributes associated with an item, such as a time that the item was last found at a retailer location, a time that the item was last not found at the retailer location, a time that the item was last delivered to the retailer location, etc. The prediction module 214 may then receive an output from the availability model corresponding to the predicted availability of the item at the retailer location, such as a percentage that indicates the likelihood that the item is available at the retailer location or a number indicating a quantity of the item predicted to be available at the retailer location.

The prediction module 214 also may predict a likelihood of conversion for an item by a customer. Examples of types of conversions include: clicking on an item, ordering an item, adding an item (e.g., to a shopping list, a shopping cart, or a wish list), or any other suitable types of conversions. The prediction module 214 may make the prediction based at least in part on historical information (e.g., historical interaction information or historical order information) for the customer stored in the data store 240. For example, the prediction module 214 may predict a likelihood that a customer will order an item based on historical order information for the customer describing previous orders placed by the customer including the item, such as a number, a frequency, or a recency of the orders, a retailer from which the customer ordered the item, etc. In this example, the prediction module 214 also may predict the likelihood based on information describing previous orders placed by the customer including items having at least a threshold measure of similarity to the item (e.g., items of the same type or brand, items that belong to the same item category, items in the same price range, etc.). In the above example, the prediction module 214 also may predict the likelihood based on information describing previous orders placed by other customers including the item, in which the customers have at least a threshold measure of similarity to the customer (e.g., similar demographic information, similar dietary preferences, etc.).

In some embodiments, the prediction module 214 may use a conversion model to predict a likelihood of conversion for an item by a customer. A conversion model is a machine learning model that is trained to predict a likelihood of conversion for an item by a customer. For example, the conversion model may be trained to predict a likelihood that a customer will order an item. In various embodiments, the conversion model may be trained by the machine learning training module 230 based at least in part on historical information (e.g., historical interaction information or historical order information) for one or more items by a customer, as described below. The prediction module 214 may use the conversion model by accessing and applying it to a set of attributes associated with a customer and an additional set of attributes associated with an item. For example, the prediction module 214 may apply the conversion model to attributes associated with a customer corresponding to the customer's shopping preferences, favorite items, favorite retailers, dietary preferences, demographic information, etc. In this example, the conversion model also may be applied to attributes associated with an item describing a size, one or more colors, a weight, a SKU, etc. associated with the item. The prediction module 214 may then receive an output from the conversion model corresponding to the predicted likelihood of conversion for the item by the customer (e.g., a percentage that indicates the predicted likelihood).

The prediction module 214 also may predict a likelihood that a customer will perform an action associated with achieving a goal associated with a brand if a template is used to generate a brand page for the brand that is presented to the customer. Examples of goals associated with a brand include: maximizing a gross merchandise value (GMV) for the brand, maximizing a number of items associated with the brand added to a shopping cart or a shopping list associated with a customer, or any other suitable types of goals. The prediction module 214 may make the prediction based at least in part on historical information (e.g., historical interaction information or historical order information) for a customer stored in the data store 240. For example, suppose that a goal associated with a brand corresponds to maximizing a GMV for the brand. In this example, the prediction module 214 may predict a likelihood that a customer will place an order via a brand page for the brand if a template is used to generate the brand page that is presented to the customer. Continuing with this example, the prediction module 214 may make the prediction based on historical order information for the customer, such as whether the customer placed orders from brand pages generated using templates with various color schemes, themes, layouts, formatting, etc.

In some embodiments, the prediction module 214 may use a template model to predict a likelihood that a customer will perform an action associated with achieving a goal associated with a brand if a template is used to generate a brand page for the brand that is presented to the customer. A template model is a machine learning model that is trained to predict a likelihood that a customer will perform an action associated with achieving a goal associated with a brand if a template is used to generate a brand page for the brand. For example, if a goal associated with a brand corresponds to maximizing a GMV for the brand, the template model may be trained to predict a likelihood that a customer will place an order via a brand page for the brand if a template is used to generate the brand page. In various embodiments, the template model may be trained by the machine learning training module 230 based at least in part on historical information (e.g., historical interaction information or historical order information) for a customer, as described below. The prediction module 214 may use the template model by accessing and applying it to a set of attributes associated with a customer and an additional set of attributes associated with a template. For example, the prediction module 214 may apply the template model to attributes associated with a customer corresponding to the customer's shopping preferences, favorite items, favorite retailers, dietary preferences, demographic information, etc. In this example, the template model also may be applied to attributes associated with a template corresponding to a color scheme, a theme, a layout (e.g., numbers and positions of placeholders included in the layout, types of components associated with the placeholders, etc.), formatting, and any other suitable types of attributes associated with the template. The prediction module 214 may then receive an output from the template model corresponding to a predicted likelihood that the customer will perform an action associated with achieving a goal associated with a brand if the template is used to generate a brand page for the brand that is presented to the customer (e.g., a percentage that indicates the predicted likelihood).

The grouping module 215 identifies a set of items associated with a brand and at least a threshold predicted availability at one or more retailer locations associated with a retailer. The grouping module 215 may do so by comparing a predicted availability of each item associated with the brand included among an inventory of a retailer at each retailer location identified by the retailer location identification module 213 to a threshold value and identifying the item if its predicted availability is at least the threshold value. For example, the grouping module 215 may compare the predicted availability of each item associated with a brand at each retailer location identified by the retailer location identification module 213 to a threshold value of 85%. In this example, the grouping module 215 then identifies a set of items associated with the brand that includes each item having a predicted availability that is at least 85%.

Once the grouping module 215 identifies a set of items associated with a brand and at least a threshold predicted availability at one or more retailer locations associated with a retailer, the grouping module 215 groups the set of items into one or more item categories. The grouping module 215 may do so based at least in part on a hierarchical taxonomy of items associated with the brand. For example, the grouping module 215 may access a hierarchical taxonomy of items associated with a brand, in which specific items are associated with item categories corresponding to levels within the hierarchical taxonomy. In this example, if items corresponding to skim milk and non-fat milk are included in a level within the hierarchical taxonomy corresponding to a "milk" item category, the grouping module 215 may group the items into a "milk" item category. In some embodiments, the grouping module 215 may group a set of items into one or more item categories based on a diversity of items associated with a brand. For example, suppose that two items corresponding to a regular sandwich cookie and a sugar-free sandwich cookie are included in a level within a hierarchical taxonomy corresponding to a "sandwich cookie" item category. In this example, suppose also that these items are included in a higher level within the hierarchical taxonomy corresponding to a "cookie" item category that includes five items and an even higher level within the hierarchical taxonomy corresponding to a "snack food" item category that includes 10 items. Continuing with this example, the grouping module 215 may group the two items into a most narrow item category that is associated with at least a threshold number of items (e.g., the "cookie" item category if the threshold number is five). Alternatively, in this example, the grouping module 215 may group the two items into a most narrow item category that is associated with at least a threshold percentage of items associated with the brand (e.g., the "snack food" item category if the threshold percentage is 5% and there are 200 items associated with the brand).

The scoring module 216 computes item scores for items included in an item category. The scoring module 216 may compute an item score for an item based on various factors. In some embodiments, the scoring module 216 may compute an item score for an item based on a measure of popularity of the item among one or more customers of the online system 140 (e.g., some or all customers within a particular timeframe). For example, the scoring module 216 may compute an item score for an item that is proportional to a number of customers who have purchased the item, a number of the items purchased, a number of customers who purchased the item more than once, a percentage of customers presented with the item who clicked on the item, etc. In the above example, the number or percentage may be computed for all customers of the online system 140 or for customers belonging to a particular demographic group (e.g., in a geographical region) within the past week or month. In various embodiments, the scoring module 216 may compute an item score for an item based on a predicted likelihood of conversion for the item by a customer to whom the item may be presented. For example, once the prediction module 214 predicts a likelihood of conversion for an item by a customer, the scoring module 216 may compute an item score for the item that is proportional to the predicted likelihood. In some embodiments, the scoring module 216 also may compute an item score for an item based on a goal (e.g., maximizing revenue) associated with a brand. For example, if a goal associated with a brand corresponds to maximizing a GMV for the brand, the scoring module 216 may compute an item score for an item associated with the brand that is proportional to a product of a predicted likelihood that a customer to whom the item may be presented will order the item and a cost associated with the item.

The scoring module 216 also computes category scores for item categories. The scoring module 216 may compute a category score for an item category based at least in part on an item score computed for each item included in the item category. For example, once the scoring module 216 computes an item score for each item included in an item category, the scoring module 216 may compute a category score for the item category that is proportional to a sum of the item scores. Alternatively, in the above example, the scoring module 216 may compute a category score for the item category that is proportional to an average of the item scores.

In some embodiments, the template selection module 217 may select templates for generating brand pages from the data store 240. The template selection module 217 may select a template for generating a brand page based on attributes of the template (e.g., color scheme, theme, formatting, numbers and positions of placeholders included in the template, types of components associated with the placeholders, etc.), information associated with a customer to whom a brand page generated using the template may be presented, or based on any other suitable types of information. For example, to create a brand page including a brand name, a logo, and five display units, the template selection module 217 may select a template for generating the brand page, in which a layout of the template includes placeholders for the brand name, logo, and five display units. In some embodiments, the template selection module 217 may select a template for generating a brand page to achieve a goal associated with a brand (e.g., to maximize revenue). In such embodiments, the template selection module 217 may select the template based on a predicted likelihood that a customer will perform an action associated with achieving the goal if a template is used to generate the brand page that is presented to the customer. For example, suppose that for each of multiple templates, the prediction module 214 has predicted a likelihood that a customer will perform an action associated with achieving a goal associated with a brand if the template is used to generate a brand page for the brand that is presented to the customer. In this example, the template selection module 217 may select a template associated with a highest predicted likelihood.

The position assignment module 218 assigns items included in item categories to item positions within display units associated with the item categories. As described above, an item position is a placeholder within a display unit in which an item included in an item category associated with the display unit may be presented. Various types of information associated with an item may be presented in an item position to which it is assigned. Examples of such types of information include: one or more images or videos of the item, a description of the item (e.g., price, manufacturer, ingredients/materials, instructions for use, etc.), availability of the item (e.g., in different colors, sizes, etc.), customer reviews, or any other suitable types of information. The position assignment module 218 may assign an item included in an item category to an item position based at least in part on an item score computed for the item. For example, suppose that for an item category that includes five items, the scoring module 216 has computed an item score for each item. In this example, the position assignment module 218 may assign each item to an item position within a display unit associated with the item category, in which the display unit corresponds to a horizontal carousel and item positions further to the left are more prominent than item positions further to the right. Continuing with this example, the position assignment module 218 may assign the items to the item positions based on their item scores, such that an item with a highest item score is assigned to the leftmost item position, an item with a second-highest item score is assigned to the second-leftmost item position, etc.

The position assignment module 218 also assigns display units associated with item categories to category positions within a template for generating brand pages. As described above, a category position is a placeholder within a template in which items included in an item category associated with a display unit assigned to the category position may be presented. The position assignment module 218 may assign a display unit associated with an item category to a category position based at least in part on a category score computed for the item category. For example, suppose that the scoring module 216 has computed a category score for each of five item categories. In this example, the position assignment module 218 may assign a display unit associated with each item category to a category position within a template for generating brand pages, in which each display unit corresponds to a horizontal carousel and category positions closer to the top are more prominent than category positions closer to the bottom. Continuing with this example, the position assignment module 218 may assign the display units to the category positions based on their associated category scores, such that a display unit associated with an item category with a highest category score is assigned to the uppermost category position, a display unit associated with an item category with a second-highest category score is assigned to the second-uppermost category position, etc.

The order management module 220 manages orders for items from customers. The order management module 220 receives orders from customer client devices 100 and assigns the orders to pickers for service based on picker data. For example, the order management module 220 assigns an order to a picker based on the picker's location and the retailer location from which the ordered items are to be collected. The order management module 220 may also assign an order to a picker based on how many items are in the order, a vehicle operated by the picker, the delivery location, the picker's preferences for how far to travel to deliver an order, the picker's ratings by customers, or how often a picker agrees to service an order.

In some embodiments, the order management module 220 determines when to assign an order to a picker based on a delivery timeframe requested by the customer who placed the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit instructions to the picker client device 110 to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online system 140. The online system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model is used by the machine learning model to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

In embodiments in which the prediction module 214 accesses an availability model that is trained to predict an availability of an item at a retailer location, the machine learning training module 230 may train the availability model. In some embodiments, the machine learning training module 230 may train the availability model to predict a likelihood that an item is available at a retailer location, while in other embodiments, the machine learning training module 230 may train the availability model to predict a quantity of an item that is available at a retailer location. The machine learning training module 230 may train the availability model via supervised learning based at least in part on attributes of items included among an inventory of a retailer that operates a retailer location and historical information describing availabilities of the items at the retailer location.

To illustrate an example of how the availability model may be trained, suppose that the machine learning training module 230 receives a set of training examples including attributes of items included among an inventory of a retailer that operates a retailer location, such as their sizes, colors, weights, SKUs, serial numbers, prices, item categories, brands, sales, discounts, qualities, ingredients, materials, manufacturing locations, etc. In this example, attributes of the items also may include times that the items were found at the retailer location, times that the items were not found at the retailer location, times that the items were delivered to the retailer location, quantities of the items that were delivered to the retailer location, rates at which the items were found at the retailer location, the popularity of the items at the retailer location, etc. In the above example, the machine learning training module 230 also may receive labels which represent expected outputs of the availability model, in which a label indicates whether an item was available at the retailer location. Alternatively, in the above example, a label may indicate a quantity of an item that was available at the retailer location. Continuing with this example, the machine learning training module 230 may then train the availability model based on the attributes of the items as well as the labels by comparing its output from input data of each training example to the label for the training example.

In embodiments in which the prediction module 214 accesses a conversion model that is trained to predict a likelihood of conversion for an item by a customer, the machine learning training module 230 may train the conversion model. The machine learning training module 230 may train the conversion model via supervised learning based at least in part on attributes of items presented to customers, attributes of the customers, and historical information (e.g., historical interaction information or historical order information) for the customers. In some embodiments, the conversion model uses item embeddings describing items and customer embeddings describing customers to predict a likelihood of conversion for an item by a customer. These item embeddings and customer embeddings may be generated by separate machine learning models and may be stored in the data store 240.

To illustrate an example of how the conversion model may be trained, suppose that the machine learning training module 230 receives a set of training examples. In this example, the set of training examples may include attributes of items presented to customers (e.g., sizes, colors, weights, SKUs, serial numbers, prices, item categories, brands, sales, discounts, qualities, ingredients, materials, manufacturing locations, etc. associated with the items). In this example, the set of training examples also may include attributes of customers to whom the items were presented, such as their shopping preferences, favorite items, favorite retailers, dietary preferences, demographic information, etc. In the above example, the machine learning training module 230 also may receive labels which represent expected outputs of the conversion model, in which a label indicates whether a customer performed an action associated with an item corresponding to a conversion (e.g., by ordering it or clicking on it). Continuing with this example, the machine learning training module 230 may then train the conversion model based on the attributes of the items and customers, as well as the labels by comparing its output from input data of each training example to the label for the training example.

In embodiments in which the prediction module 214 accesses a template model that is trained to predict a likelihood that a customer will perform an action associated with achieving a goal associated with a brand if a template is used to generate a brand page for the brand that is presented to the customer, the machine learning training module 230 may train the template model. The machine learning training module 230 may train the template model via supervised learning based at least in part on attributes of customers, attributes of templates used to generate brand pages presented to the customers, and historical information (e.g., historical interaction information or historical order information) for the customers.

To illustrate an example of how the template model may be trained, suppose that the machine learning training module 230 receives a set of training examples. In this example, the set of training examples may include attributes of customers to whom brand pages were presented, such as their shopping preferences, favorite items, favorite retailers, dietary preferences, demographic information, etc. In this example, the set of training examples also may include attributes of templates used to generate brand pages presented to the customers, such as color schemes, themes, layouts (e.g., numbers and positions of placeholders, types of components associated with the placeholders, etc.), formatting, or any other suitable attributes. In the above example, the machine learning training module 230 also may receive labels which represent expected outputs of the template model, in which a label indicates whether a customer performed an action associated with achieving a goal associated with a brand when presented with a brand page generated using a template (e.g., ordering an item associated with the brand or clicking on it). Continuing with this example, the machine learning training module 230 may then train the template model based on the attributes of the customers and templates, as well as the labels by comparing its output from input data of each training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In situations in which the training example includes a label, the loss function is also based on the label for the training example. Some example loss functions include the mean square error function, the mean absolute error, the hinge loss function, and the cross-entropy loss function. The machine learning training module 230 updates the set of parameters for the machine learning model based on the score generated by the loss function. For example, the machine learning training module 230 may apply gradient descent to update the set of parameters.

The data store 240 stores data used by the online system 140. For example, the data store 240 stores customer data, item data, order data, and picker data for use by the online system 140. As an additional example, the data store 240 stores brand data (e.g., hierarchical taxonomies of items associated with brands) and templates for generating brand pages for use by the online system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

Automatically Generating a Retailer-Specific Brand Page

Figure 3:
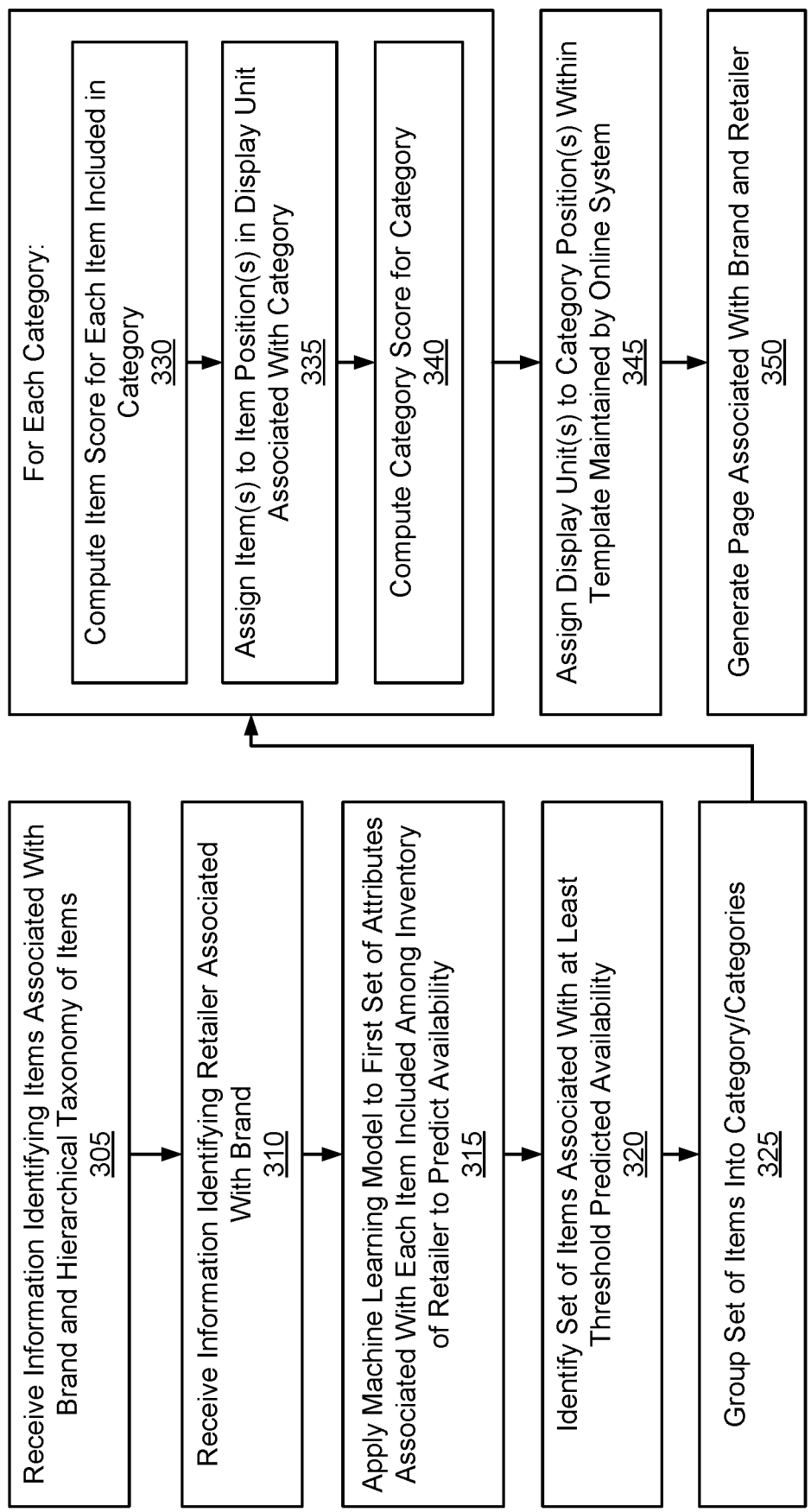
FIG. 3 is a flowchart of a method for automatically generating a retailer-specific brand page, in accordance with one or more embodiments.

FIG. 3 is a flowchart of a method for automatically generating a retailer-specific brand page, in accordance with one or more embodiments. Alternative embodiments may include more, fewer, or different steps from those illustrated in FIG. 3, and the steps may be performed in a different order from that illustrated in FIG. 3. These steps may be performed by an online system (e.g., online system 140), such as an online concierge system. Additionally, each of these steps may be performed automatically by the online system 140 without human intervention.

The online system 140 receives 305 (e.g., via the data collection module 200) information identifying items associated with a brand. The online system 140 may receive 305 the information from an entity associated with the brand (e.g., a retailer computing system 120 associated with a retailer that offers items associated with the brand for purchase) or any other suitable source. The online system 140 may receive 305 the information in association with a name of the brand, a logo associated with the brand, other information associated with the items (e.g., images or videos of the items, descriptions of the items, customer reviews, etc.), campaigns associated with the brand, images or videos associated with the brand, or any other suitable types of information associated with the brand. In some embodiments, the information identifying the items may be received 305 in the form of a catalog of items that identifies the items associated with the brand offered for purchase by one or more retailers. In various embodiments, the catalog of items may be human-generated and human-populated with items (e.g., based on universal product codes (UPCs) associated with each brand). Alternatively, the catalog of items may be generated by the online system 140 (e.g., using the data collection module 200) by querying item data stored in the online system 140 (e.g., in the data store 240) for items associated with the brand. For example, the online system 140 may query the item data for items by a "brand" field to generate the catalog of items associated with the brand.

The online system 140 also may receive 305 the information identifying the items associated with the brand in association with a hierarchical taxonomy of items. The hierarchical taxonomy of items organizes the items associated with the brand, in which different levels of the hierarchical taxonomy provide different levels of specificity about items included in the levels. In some embodiments, rather than receiving 305 the hierarchical taxonomy of items, the online system 140 may determine (e.g., using the data collection module 200) the hierarchical taxonomy from the catalog of items associated with the brand. In such embodiments, the online system 140 may do so by applying a trained classification model to the catalog of items to include different items in levels of the hierarchical taxonomy, such that specific items are associated with item categories corresponding to levels within the hierarchical taxonomy.

The hierarchical taxonomy of items associated with the brand may identify an item category and associate one or more specific items with the item category. For example, if an item category identifies "milk," the hierarchical taxonomy of items may associate identifiers of different milk items (e.g., milk having different attributes) with the item category. Thus, the hierarchical taxonomy of items maintains associations between an item category and specific items associated with the brand matching the item category. Furthermore, different levels of the hierarchical taxonomy of items may identify items with differing levels of specificity based on any suitable attribute or combination of attributes of the items. For example, different levels of the hierarchical taxonomy of items may specify different combinations of attributes of items, such that items in lower levels of the hierarchical taxonomy have a greater number of attributes, corresponding to greater specificity in an item category, while items in higher levels of the hierarchical taxonomy have a fewer number of attributes, corresponding to less specificity in an item category. In various embodiments, higher levels of the hierarchical taxonomy of items may include fewer details about items, such that greater numbers of items are included in higher levels (e.g., higher levels include a greater number of items satisfying a broader item category). Similarly, lower levels of the hierarchical taxonomy of items may include greater details about items, such that fewer numbers of items are included in the lower levels (e.g., lower levels include a fewer number of items satisfying a more specific item category).

The online system 140 also receives 310 (e.g., via the data collection module 200) information identifying one or more retailers associated with the brand, in which at least one item associated with the brand is included among an inventory of the retailer. The online system 140 may receive 310 the information identifying the retailer(s) associated with the brand from the retailer(s) (e.g., via one or more retailer computing systems 120), another entity associated with the brand, or any other suitable source. For example, the online system 140 may receive 310 item data from a retailer computing system 120 associated with a retailer indicating which items associated with the brand are available at a retailer location and the quantities of those items.

In some embodiments, the online system 140 also may receive a request from a customer client device 100 associated with a customer to access a brand page for the brand. For example, when the customer interacts with an object (e.g., an advertisement presented by the online system 140 or an external website) associated with the brand, the online system 140 may receive a request from the customer client device 100 to access a brand page for the brand. As described above, a brand page is a page (e.g., a webpage or a profile page maintained by the online system 140) that is associated with a brand and may be a landing page to which objects (e.g., advertisements presented by the online system 140 or external websites) associated with the brand are linked. For example, a brand page may be linked to a result in a list of search results returned by a search engine or to details for an item associated with a brand presented by a social networking system. As also described above, a brand page may allow customers to order items associated with a brand. For example, via a brand page, customers may add items associated with a brand to shopping lists or shopping carts and place orders including the items. A brand page also may be associated with a retailer. For example, a brand page may include items associated with a brand that are available for customers to purchase from one or more retailer locations operated by a retailer.

The online system 140 then predicts (e.g., using the prediction module 214) an availability of each item included among an inventory of the retailer(s) at one or more retailer locations associated with the retailer(s). The online system 140 may make the prediction based at least in part on information received from one or more retailer computing systems 120 or item data stored in the online system 140 (e.g., in the data store 240). For example, based on information describing a time that an item was last found at a retailer location, a time that the item was last not found at the retailer location, a time that the item was last delivered to the retailer location, etc., the online system 140 may predict an availability of the item at the retailer location.

In some embodiments, the online system 140 may use the availability model to predict an availability of an item at a retailer location. In various embodiments, the availability model may be trained by the online system 140 (e.g., using the machine learning training module 230) based at least in part on historical information describing availabilities of items at a retailer location. The online system 140 may use the availability model by accessing (e.g., using the prediction model 214) and applying 315 (e.g., using the prediction model 214) the model to a set of attributes associated with an item. For example, the online system 140 may apply 315 the availability model to attributes associated with an item, such as a size, one or more colors, a weight, a SKU, etc. associated with the item, a time that the item was last found at a retailer location, a time that the item was last not found at the retailer location, a time that the item was last delivered to the retailer location, etc. The online system 140 may then receive an output from the availability model corresponding to the predicted availability of the item at the retailer location (e.g., a percentage that indicates the likelihood that the item is available at the retailer location or a number indicating a quantity of the item predicted to be available at the retailer location).

In various embodiments, the online system 140 also may predict (e.g., using the prediction module 214) a likelihood of conversion for an item associated with the brand by a customer (e.g., a customer from whom a request to access a brand page for the brand was received). Examples of types of conversions include: clicking on an item, ordering an item, adding an item (e.g., to a shopping list, a shopping cart, or a wish list), or any other suitable types of conversions. The online system 140 may make the prediction based at least in part on historical information (e.g., historical interaction information or historical order information) for the customer stored in the online system 140 (e.g., in the data store 240). For example, the online system 140 may predict a likelihood that the customer will order an item based on historical order information for the customer describing previous orders placed by the customer including the item, such as a number, a frequency, or a recency of the orders, a retailer from which the customer ordered the item, etc. In this example, the online system 140 also may predict the likelihood based on information describing previous orders placed by the customer including items having at least a threshold measure of similarity to the item (e.g., items of the same type or brand, items that belong to the same item category, items in the same price range, etc.). In the above example, the online system 140 also may predict the likelihood based on information describing previous orders placed by other customers including the item, in which the customers have at least a threshold measure of similarity to the customer (e.g., similar demographic information, similar dietary preferences, etc.).

In some embodiments, the online system 140 may use a conversion model to predict the likelihood of conversion for an item associated with the brand by the customer. A conversion model is a machine learning model that is trained to predict a likelihood of conversion for an item by a customer. For example, the conversion model may be trained to predict a likelihood that a customer will order an item. In various embodiments, the conversion model may be trained by the online system 140 (e.g., using the machine learning training module 230) based at least in part on historical information (e.g., historical interaction information or historical order information) for one or more items by a customer. The online system 140 may use the conversion model by accessing (e.g., using the prediction model 214) and applying (e.g., using the prediction model 214) the model to a set of attributes associated with the customer and an additional set of attributes associated with an item. For example, the online system 140 may apply the conversion model to attributes associated with the customer corresponding to the customer's shopping preferences, favorite items, favorite retailers, dietary preferences, demographic information, etc. In this example, the conversion model also may be applied to attributes associated with an item describing a size, one or more colors, a weight, a SKU, etc. associated with the item. The online system 140 may then receive an output from the conversion model corresponding to the predicted likelihood of conversion for the item by the customer (e.g., a percentage that indicates the predicted likelihood).

In embodiments in which the online system 140 receives 310 information identifying multiple retailers associated with the brand, the online system 140 may select (e.g., using the retailer selection module 212) a retailer associated with the brand. The online system 140 may do so based on predicted likelihoods of conversion for items included among inventories of the retailers, predicted availabilities of items included among inventories of the retailers, information associated with a customer (e.g., a customer from whom a request to access a brand page for the brand was received), or any other suitable types of information. For example, if an average of the likelihoods that the customer will order items associated with a brand from a first retailer is higher than an average of the likelihoods that the customer will order items associated with the brand from a second retailer, the online system 140 may select the first retailer instead of the second retailer. As an additional example, if a greater number or percentage of items associated with a brand are predicted to be available at retailer locations associated with a first retailer than at retailer locations associated with a second retailer, the online system 140 may select the first retailer instead of the second retailer. In the above example, the retailer locations may be selected based on a geographical location associated with the customer (e.g., the customer's address or a default delivery location for orders placed by the customer), such that the retailer locations are within a threshold distance of the geographical location or in the same geographical region as the geographical location. As another example, based on historical order information for the customer, the online system 140 may select a retailer associated with the brand from which the customer previously ordered items associated with the brand. As yet another example, if the customer has requested to access the brand page for the brand by interacting with an object presented via a storefront associated with a retailer or has requested to access the brand page after adding items to a shopping cart or a shopping list associated with the retailer, the online system 140 may select the retailer instead of other retailers associated with the brand.

The online system 140 then identifies (e.g., using the retailer location identification module 213) one or more retailer locations associated with a retailer associated with the brand (e.g., the selected retailer if the online system 140 receives 310 information identifying multiple retailers associated with the brand). The retailer location identification module 213 may do so based at least in part on information identifying the retailer (e.g., received from the data collection module 200, the retailer selection module 212, in a request to access a brand page for the brand, etc.) and a geographical location associated with a customer (e.g., a customer from whom a request to access a brand page for the brand was received). For example, suppose that the online system 140 receives a request from a customer client device 100 associated with the customer to access a brand page for the brand, in which the brand page is associated with a retailer. In this example, the online system 140 may access customer data (e.g., from the data store 240) describing a geographical location associated with the customer corresponding to the customer's address or a default delivery location for orders placed by the customer. Continuing with this example, based on the geographical location associated with the customer and information identifying the retailer included in the request, the online system 140 may identify one or more retailer locations operated by the retailer within a threshold distance of the geographical location or in the same geographical region as the geographical location.

The online system 140 then predicts (e.g., using the prediction module 214) the availability of each item included among the inventory of the retailer at the retailer location(s) identified by the online system 140. As described above, the online system 140 may do so by accessing (e.g., using the prediction model 214) and applying 315 (e.g., using the prediction model 214) the availability model to a set of attributes associated with each item. The online system 140 may then receive an output from the availability model corresponding to the predicted availability of the item at a retailer location.

The online system 140 then identifies 320 (e.g., using the grouping module 215) a set of items associated with the brand and at least a threshold predicted availability at the retailer location(s). The online system 140 may do so by comparing a predicted availability of each item included among an inventory of the retailer at each retailer location identified by the online system 140 to a threshold value and identifying 320 the item if its predicted availability is at least the threshold value. For example, the online system 140 may compare the predicted availability of each item at each retailer location identified by the online system 140 to a threshold value of 85%. In this example, the online system 140 then identifies 320 the set of items that includes each item having a predicted availability that is at least 85%.

Once the online system 140 identifies 320 the set of items associated with the brand and at least the threshold predicted availability at the retailer location(s) associated with the retailer, the online system 140 groups 325 (e.g., using the grouping module 215) the set of items into one or more item categories. The online system 140 may do so based at least in part on the hierarchical taxonomy of items associated with the brand. For example, the online system 140 may access the hierarchical taxonomy of items associated with the brand, in which specific items are associated with item categories corresponding to levels within the hierarchical taxonomy. In this example, if items corresponding to skim milk and non-fat milk are included in a level within the hierarchical taxonomy corresponding to a "milk" item category, the online system 140 may group 325 the items into a "milk" item category. In some embodiments, the online system 140 may group 325 the set of items into the one or more item categories based on a diversity of items associated with the brand. For example, suppose that two items corresponding to a regular sandwich cookie and a sugar-free sandwich cookie are included in a level within the hierarchical taxonomy corresponding to a "sandwich cookie" item category. In this example, suppose also that these items are included in a higher level within the hierarchical taxonomy corresponding to a "cookie" item category that includes five items and an even higher level within the hierarchical taxonomy corresponding to a "snack food" item category that includes 10 items. Continuing with this example, the online system 140 may group 325 the two items into a most narrow item category that is associated with at least a threshold number of items (e.g., the "cookie" item category if the threshold number is five). Alternatively, in this example, the online system 140 may group 325 the two items into a most narrow item category that is associated with at least a threshold percentage of items associated with the brand (e.g., the "snack food" item category if the threshold percentage is 5% and there are 200 items associated with the brand).

For each category of the one or more categories, the online system 140 computes 330 (e.g., using the scoring module 216) an item score for each item included in a corresponding item category. The online system 140 may compute 330 an item score for an item based on various factors. In some embodiments, the online system 140 may compute 330 an item score for an item based on a measure of popularity of the item among one or more customers of the online system 140 (e.g., some or all customers within a particular timeframe). For example, the online system 140 may compute 330 an item score for an item that is proportional to a number of customers who have purchased the item, a number of the items purchased, a number of customers who purchased the item more than once, a percentage of customers presented with the item who clicked on the item, etc. In the above example, the number or percentage may be computed 330 for all customers of the online system 140 or for customers belonging to a particular demographic group (e.g., in a geographical region) within the past week or month. In various embodiments, the online system 140 may compute 330 an item score for an item based on a predicted likelihood of conversion for the item by a customer (e.g., a customer from whom a request to access a brand page for the brand was received). For example, once the online system 140 predicts a likelihood of conversion for an item by the customer, the online system 140 may compute 330 an item score for the item that is proportional to the predicted likelihood. In some embodiments, the online system 140 also may compute 330 an item score for an item based on a goal (e.g., maximizing revenue) associated with the brand. For example, if a goal associated with the brand corresponds to maximizing a value for the brand (e.g., a measure of the total revenue generated through the sale of goods or services, such as gross merchandise value or GMV), the online system 140 may compute 330 an item score for an item that is proportional to a product of a predicted likelihood that the customer will order the item and a cost associated with the item.

Figure 4:
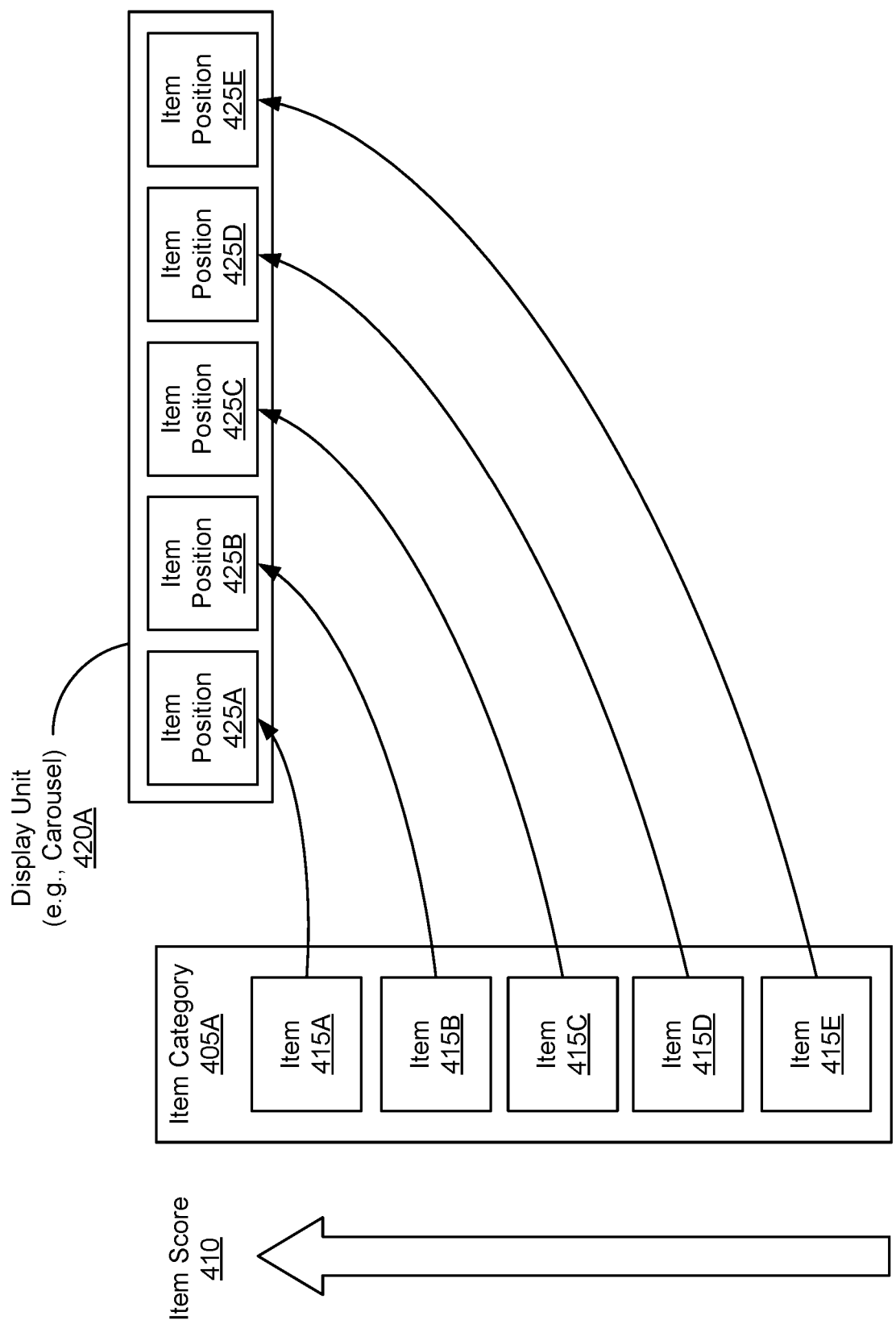
FIG. 4 illustrates an example of assigning items included in an item category to item positions within a display unit, in accordance with one or more embodiments.

The online system 140 then assigns 335 (e.g., using the position assignment module 218) items included in each item category to item positions within a display unit associated with the item category. As described above, an item position is a placeholder within a display unit in which an item included in an item category associated with the display unit may be presented. Various types of information associated with an item may be presented in an item position to which it is assigned. Examples of such types of information include: one or more images or videos of the item, a description of the item (e.g., price, manufacturer, ingredients/materials, instructions for use, etc.), availability of the item (e.g., in different colors, sizes, etc.), customer reviews, or any other suitable types of information. The online system 140 may assign 335 an item included in an item category to an item position based at least in part on an item score computed 330 for the item. For example, as shown in FIG. 4, which illustrates an example of assigning (step 335) items 415 included in an item category 405 to item positions 425 within a display unit 420, in accordance with one or more embodiments, suppose that for an item category 405A that includes five items 415A-E, the online system 140 has computed 330 an item score 410 for each item 415A-E. In this example, the online system 140 may assign 335 each item 415A-E to an item position 425A-E within a display unit 420A associated with the item category 405A, in which the display unit 420A corresponds to a horizontal carousel and item positions 425 further to the left are more prominent than item positions 425 further to the right. Continuing with this example, the online system 140 may assign 335 the items 415A-E to the item positions 425A-E based on their item scores 410, such that an item 415A with a highest item score 410 is assigned 335 to the leftmost item position 425A, an item 415B with a second-highest item score 410 is assigned 335 to the second-leftmost item position 425B, etc.

Referring back to FIG. 3, the online system 140 also computes 340 (e.g., using the scoring module 216) a category score for each item category 405. The online system 140 may compute 340 a category score for an item category 405 based at least in part on an item score 410 computed 330 for each item 415 included in the item category 405. For example, once the online system 140 computes 330 an item score 410 for each item 415 included in an item category 405, the online system 140 may compute 340 a category score for the item category 405 that is proportional to a sum of the item scores 410. Alternatively, in the above example, the online system 140 may compute 340 a category score for the item category 405 that is proportional to an average of the item scores 410.

In various embodiments, the online system 140 may predict (e.g., using the prediction module 214) a likelihood that a customer (e.g., a customer from whom a request to access a brand page for the brand was received) will perform an action associated with achieving a goal associated with the brand if a template is used to generate a brand page for the brand that is presented to the customer. Examples of goals associated with the brand include: maximizing a GMV for the brand, maximizing a number of items 415 associated with the brand added to a shopping cart or a shopping list associated with the customer, or any other suitable types of goals. The online system 140 may make the prediction based at least in part on historical information (e.g., historical interaction information or historical order information) for the customer (e.g., stored in the data store 240). For example, suppose that a goal associated with the brand corresponds to maximizing a GMV for the brand. In this example, the online system 140 may predict a likelihood that the customer will place an order via a brand page for the brand generated using a template. Continuing with this example, the online system 140 may make the prediction based on historical order information for the customer describing previous orders placed by the customer via brand pages generated using various templates, such as whether the customer placed orders from brand pages generated using templates with various color schemes, themes, layouts, formatting, etc.

In some embodiments, the online system 140 may use a template model to predict the likelihood that the customer will perform the action associated with achieving the goal associated with the brand if a template is used to generate a brand page for the brand that is presented to the customer. A template model is a machine learning model that is trained to predict a likelihood that a customer will perform an action associated with achieving a goal associated with a brand if a template is used to generate a brand page for the brand. For example, if a goal associated with the brand corresponds to maximizing a GMV for the brand, the template model may be trained to predict a likelihood that a customer will place an order via a brand page for the brand if a specific template is used to generate the brand page. In various embodiments, the template model may be trained by the online system 140 (e.g., using the machine learning training module 230) based at least in part on historical information (e.g., historical interaction information or historical order information) for a customer. The online system 140 may use the template model by accessing (e.g., using the prediction module 214) and applying (e.g., using the prediction module 214) the model to a set of attributes associated with the customer and an additional set of attributes associated with a template. For example, the online system 140 may apply the template model to attributes associated with the customer corresponding to the customer's shopping preferences, favorite items 415, favorite retailers, dietary preferences, demographic information, etc. In this example, the template model also may be applied to attributes associated with a template corresponding to a color scheme, a theme, a layout (e.g., numbers and positions of placeholders included in the layout, types of components associated with the placeholders, etc.), formatting, and any other suitable types of attributes associated with the template. The online system 140 may then receive an output from the template model corresponding to the predicted likelihood that the customer will perform the action if the template is used to generate a brand page for the brand that is presented to the customer (e.g., a percentage that indicates the predicted likelihood).

In some embodiments, the online system 140 may select (e.g., using the template selection module 217) a template for generating a brand page for the brand (e.g., from the data store 240). As described above, a template may include placeholders for various components of a brand page, such as a brand name, a brand logo, display units 420 (e.g., carousels, grids, lists, etc. for presenting content including text, images, videos, etc.) in different areas within the template. The online system 140 may select the template based on attributes of the template (e.g., color scheme, theme, formatting, numbers and positions of placeholders included in the template, types of components associated with the placeholders, etc.), information associated with a customer to whom the brand page generated using the template may be presented, or based on any other suitable types of information. For example, to create a brand page including a brand name, a logo, and five display units 420, the online system 140 may select a template for generating the brand page, in which a layout of the template includes placeholders for the brand name, logo, and five display units 420. In some embodiments, the online system 140 may select a template for generating a brand page to achieve a goal associated with the brand (e.g., to maximize revenue). In such embodiments, the online system 140 may select the template based on a predicted likelihood that a customer will perform an action associated with achieving the goal if a template is used to generate the brand page that is presented to the customer. For example, suppose that for each of multiple templates, the online system 140 has predicted a likelihood that a customer will perform an action associated with achieving a goal associated with the brand if the template is used to generate a brand page for the brand that is presented to the customer. In this example, the online system 140 may select a template associated with a highest predicted likelihood.

Figure 5:
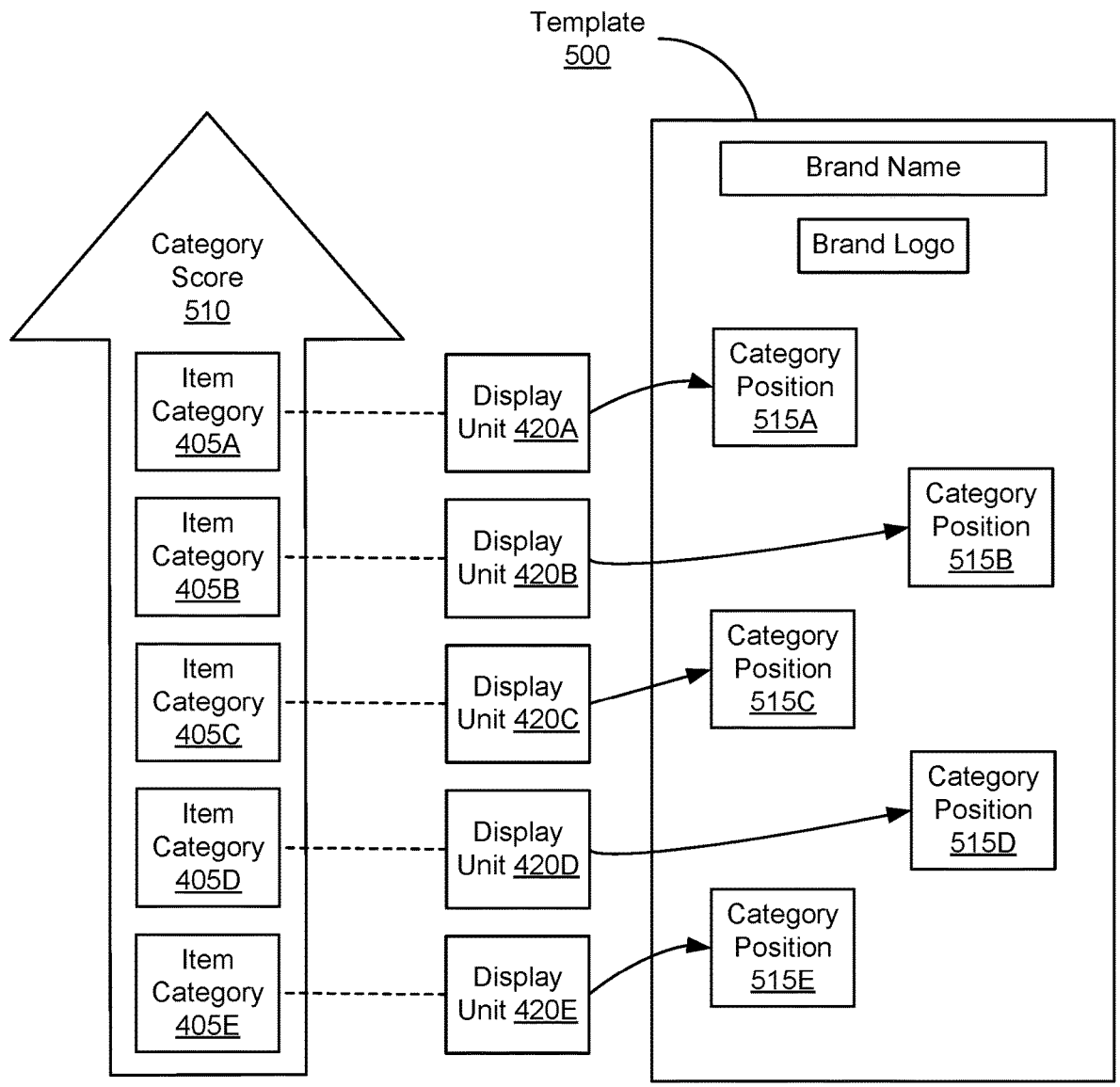
FIG. 5 illustrates an example of assigning display units associated with item categories to category positions within a template, in accordance with one or more embodiments.

The online system 140 then assigns 345 (e.g., using the position assignment module 218) the display unit(s) 420 associated with the one or more item categories to one or more category positions within the template. As described above, a category position is a placeholder within a template in which items 415 included in an item category 405 associated with a display unit 420 assigned 345 to the category position may be presented. The online system 140 may assign 345 a display unit 420 associated with an item category 405 to a category position based at least in part on a category score computed 340 for the item category 405. For example, as shown in FIG. 5, which illustrates an example of assigning (step 345) display units 420 associated with item categories 405 to category positions 515 within a template 500, in accordance with one or more embodiments, suppose that the online system 140 has computed 340 a category score 510 for each of five item categories 405A-E. In this example, the online system 140 may assign 345 a display unit 420A-E associated with each item category 405A-E to a category position 515A-E within a template 500 for generating brand pages, in which each display unit 420A-E corresponds to a horizontal carousel and category positions 515 closer to the top are more prominent than category positions 515 closer to the bottom. Continuing with this example, the online system 140 may assign 345 the display units 420A-E to the category positions 515A-E based on their associated category scores 510, such that a display unit 420A associated with an item category 405A with a highest category score 510 is assigned 345 to the uppermost category position 515A, a display unit 420B associated with an item category 405B with a second-highest category score 510 is assigned 345 to the second-uppermost category position 515B, etc.

Referring once more to FIG. 3, the online system 140 then generates 350 (e.g., using the interface module 211) a brand page for the brand and sends it for display to a customer client device 100 associated with a customer from whom a request to access the brand page was received. The online system 140 may generate 350 the brand page based at least in part on the one or more display units 420 assigned 345 to the one or more category positions 515 within the template 500 and the one or more items 415 assigned 335 to the one or more item positions 425 within the display unit 420 associated with each item category 405. For example, suppose that the online system 140 has assigned 345 each of multiple display units 420 to a category position 515 within the template 500 maintained by the online system 140 (e.g., using the interface module 211), in which each display unit 420 is associated with an item category 405. In this example, suppose also that the online system 140 has assigned 335 each item 415 included in each item category 405 to an item position 425 within a display unit 420 associated with the item category 405. Continuing with this example, the online system 140 may generate 350 the brand page such that each category position 515 of the template 500 is populated with a display unit 420 to which it was assigned 345 and each item position 425 within a display unit 420 is populated with an item 415 to which it was assigned 335.

In various embodiments, the online system 140 may generate (step 350) multiple brand pages for the brand, in which each brand page is associated with a different retailer (e.g., each retailer associated with the brand identified in the information received 310 by the online system 140). In such embodiments, the online system 140 may select (e.g., using the interface module 211) a brand page to send for display to the customer client device 100 associated with the customer based on various types of information, such as information included in the request to access the brand page, information associated with each retailer, customer data associated with the customer, etc. For example, suppose that the online system 140 receives a request from the customer client device 100 associated with the customer to access the brand page for the brand when the customer interacts with an object (e.g., an advertisement presented by the online system 140 or an external website) associated with the brand. In this example, based on information identifying the brand and a retailer associated with the object included in the request, the online system 140 may select a brand page for the brand associated with the retailer and send it for display to the customer client device 100. Alternatively, in the above example, the online system 140 may access information describing a set of favorite retailers associated with the customer and select a brand page for the brand associated with a retailer included among the set of favorite retailers and send it for display to the customer client device 100. As yet another example, based on geographical locations associated with retailer locations operated by each retailer associated with a brand page and a delivery location associated with the customer, the online system 140 may select a brand page associated with a retailer that operates a retailer location closest to the delivery location and send the selected brand page for display to the customer client device 100.

ADDITIONAL CONSIDERATIONS

The foregoing description of the embodiments has been presented for the purpose of illustration; many modifications and variations are possible while remaining within the principles and teachings of the above description. Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated with the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method for generating brand pages, each of the brand pages being a graphical user interface associated with a corresponding brand, performed at a computer system comprising a processor and a computer-readable medium, comprising:
   receiving, at an online system, information identifying a plurality of items associated with each of a plurality of brands and a hierarchical taxonomy of the plurality of items, wherein receiving the information comprises: selecting the plurality of items based on a brand of each item, and wherein the plurality of items is included in a catalog of items associated with the brand;
   receiving information identifying a retailer associated with each of the plurality of brands, wherein at least one item of the plurality of items is included among an inventory of the retailer;
   dynamically generating brand pages for the plurality of brands based on the received information and displaying the dynamically generated brand pages on client devices associated with users, comprising:
      applying a machine learning model to a first set of attributes associated with each item included among the inventory of the retailer to predict an availability of each item at one or more retailer locations associated with the retailer, wherein the machine learning model comprises a set of parameters that transform an input to the machine learning model to an output, and the machine learning model is trained by:
         receiving a set of training examples, each training example including a label indicating whether an item was available at a retailer location and a set of attributes of the item,
         updating the machine learning model by applying the machine learning model to each training example, comparing an output from the machine learning model to the label of the training example to compute a loss score which indicates a difference between the output and the label, computing, based on the loss score, gradients of the set of parameters, and
         modifying the set of parameters of the machine learning model by combining the computed gradients of the parameters with current values of the parameters of the machine learning model;
      identifying a set of items from the plurality of items, wherein the set of items is associated with at least a threshold predicted availability at the one or more retailer locations associated with the retailer;
      grouping the set of items into one or more item categories based at least in part on the hierarchical taxonomy of the plurality of items;
      for each item category of the one or more item categories:
         computing an item score for each item included in a corresponding item category of a particular brand based at least in part on one or more of: a measure of popularity of a corresponding item among a plurality of users of the online system, the first set of attributes associated with the corresponding item, and a second set of attributes associated with a user of the online system,
         assigning one or more items included in the corresponding item category to one or more item positions within a display unit associated with the corresponding item category based at least in part on the item score computed for each item, and
         computing a category score for the corresponding item category of the particular brand based at least in part on the item score computed for each item;
      assigning one or more display units associated with the one or more item categories to one or more category positions within a template maintained by the online system based at least in part on the category score computed for each item category; and
      generating a brand page associated with the particular brand and the retailer based at least in part on the one or more display units assigned to the one or more category positions within the template and the one or more items assigned to the one or more item positions; and
      transmitting the brand page to a client device associated with a user, causing the brand page to be displayed on the client device associated with the user;
   in response to receiving updated information identifying the plurality of items associated with the brand or updated retailer inventory information,
      reapplying the machine learning model to the updated information to generate updated predicted availability scores for the items;
      dynamically regenerating the brand page based at least in part on the updated predicted availability scores, wherein the updated brand page updates item positions within a display unit based on the updated predicted availability scores, such that an item with an increased predicted availability score is arranged in a more prominent position of the brand page over an item with a decreased predicted availability score that was previously displayed in the brand page; and
   transmitting the updated brand page to the client device associated with the user, causing the updated brand page to be displayed on the client device associated with the user.

2. The method of claim 1, further comprising:
selecting the retailer from one or more retailers based at least in part on the predicted availability of each item at the one or more retailer locations associated with the retailer.

3. The method of claim 1, further comprising:
receiving a request from a client device associated with a user of the online system to access the page associated with the brand and the retailer; and
sending the page associated with the brand and the retailer for display to the client device associated with the user.

4. The method of claim 3, wherein the retailer is selected from one or more retailers based at least in part on information received from the client device identifying the retailer.

5. The method of claim 3, further comprising:
identifying the one or more retailer locations associated with the retailer based at least in part on a geographical location associated with the user.

6. The method of claim 3, further comprising:
applying an additional machine learning model to the first set of attributes associated with the corresponding item and the second set of attributes associated with the user to predict a conversion likelihood for the corresponding item by the user.

7. The method of claim 6, wherein the retailer is selected from one or more retailers based at least in part on the conversion likelihood for the corresponding item by the user.

8. The method of claim 6, wherein computing the item score for each item included in the corresponding item category is further based at least in part on the conversion likelihood for the corresponding item by the user.

9. The method of claim 1, wherein computing the item score for each item included in the corresponding item category is further based at least in part on a goal associated with the brand, wherein the goal comprises maximizing a gross merchandise value associated with the brand.

10. The method of claim 1, wherein grouping the set of items into the one or more item categories is further based at least in part on a diversity of the plurality of items.

11. A computer program product for generating a brand pages, each of the brand pages being a graphical user interface associated with a corresponding brand, comprising a non-transitory computer-readable storage medium having instructions encoded thereon that, when executed by a processor, cause the processor to perform steps comprising:
receiving, at an online system, information identifying a plurality of items associated with each of a plurality of brands and a hierarchical taxonomy of the plurality of items, wherein receiving the information comprises: selecting the plurality of items based on a brand of each item, and wherein the plurality of items is included in a catalog of items associated with the brand;
receiving information identifying a retailer associated with each of the plurality of brands, wherein at least one item of the plurality of items is included among an inventory of the retailer;
dynamically generating brand pages for the plurality of brands based on the received information and displaying the dynamically generated brand pages on client devices associated with users, comprising:
applying a machine learning model to a first set of attributes associated with each item included among the inventory of the retailer to predict an availability of each item at one or more retailer locations associated with the retailer, wherein the machine learning model comprises a set of parameters that transform an input to the machine learning model to an output, and the machine learning model is trained by:
receiving a set of training examples, each training example including a label indicating whether an item was available at a retailer location and a set of attributes of the item,
updating the machine learning model by applying the machine learning model to each training example,
comparing an output from the machine learning model to the label of the training example to compute a loss score which indicates a difference between the output and the label,
computing, based on the loss score, gradients of the set of parameters, and
modifying the set of parameters of the machine learning model by combining the computed gradients of the parameters with current values of the parameters of the machine learning model;
identifying a set of items from the plurality of items, wherein the set of items is associated with at least a threshold predicted availability at the one or more retailer locations associated with the retailer;
grouping the set of items into one or more item categories based at least in part on the hierarchical taxonomy of the plurality of items;
for each item category of the one or more item categories:
computing an item score for each item included in a corresponding item category of a particular brand based at least in part on one or more of: a measure of popularity of a corresponding item among a plurality of users of the online system, the first set of attributes associated with the corresponding item, and a second set of attributes associated with a user of the online system,
assigning one or more items included in the corresponding item category to one or more item positions within a display unit associated with the corresponding item category based at least in part on the item score computed for each item, and
computing a category score for the corresponding item category of the particular brand based at least in part on the item score computed for each item;
assigning one or more display units associated with the one or more item categories to one or more category positions within a template maintained by the online system based at least in part on the category score computed for each item category;
generating a brand page associated with the particular brand and the retailer based at least in part on the one or more display units assigned to the one or more category positions within the template and the one or more items assigned to the one or more item positions; and
transmitting the brand page to a client device associated with a user, causing the brand page to be displayed on the client device associated with the user;
in response to receiving updated information identifying the plurality of items associated with the brand or updated retailer inventory information,
reapplying the machine learning model to the updated information to generate updated predicted availability scores for the items;

dynamically regenerating the brand page based at least in part on the updated predicted availability scores, wherein the updated brand page updates item positions within a display unit based on the updated predicted availability scores, such that an item with an increased predicted availability score is arranged in a more prominent position of the brand page over an item with a decreased predicted availability score that was previously displayed in the brand page; and transmitting the updated brand page to the client device associated with the user, causing the updated brand page to be displayed on the client device associated with the user.

12. The computer program product of claim 11, wherein the computer-readable storage medium further has instructions encoded thereon that, when executed by the processor, cause the processor to perform steps comprising:

selecting the retailer from one or more retailers based at least in part on the predicted availability of each item at the one or more retailer locations associated with the retailer.

13. The computer program product of claim 11, wherein the computer-readable storage medium further has instructions encoded thereon that, when executed by the processor, cause the processor to perform steps comprising:

receiving a request from a client device associated with a user of the online system to access the page associated with the brand and the retailer; and sending the page associated with the brand and the retailer for display to the client device associated with the user.

14. The computer program product of claim 13, wherein the retailer is selected from one or more retailers based at least in part on information received from the client device identifying the retailer.

15. The computer program product of claim 13, wherein the computer-readable storage medium further has instructions encoded thereon that, when executed by the processor, cause the processor to perform steps comprising:

identifying the one or more retailer locations associated with the retailer based at least in part on a geographical location associated with the user.

16. The computer program product of claim 13, wherein the computer-readable storage medium further has instructions encoded thereon that, when executed by the processor, cause the processor to perform steps comprising:

applying an additional machine learning model to the first set of attributes associated with the corresponding item and the second set of attributes associated with the user to predict a conversion likelihood for the corresponding item by the user.

17. The computer program product of claim 16, wherein the retailer is selected from one or more retailers based at least in part on the conversion likelihood for the corresponding item by the user.

18. The computer program product of claim 16, wherein computing the item score for each item included in the corresponding item category is further based at least in part on the conversion likelihood for the corresponding item by the user.

19. The computer program product of claim 11, wherein computing the item score for each item included in the corresponding item category is further based at least in part on a goal associated with the brand, wherein the goal comprises maximizing a gross merchandise value associated with the brand.

20. A computer system for generating brand pages, each of the brand pages being a graphical user interface associated with a corresponding brand, comprising:

a processor; and a non-transitory computer-readable storage medium storing instructions that, when executed by the processor, perform actions comprising:

receiving, at an online system, information identifying a plurality of items associated with each of a plurality of brands and a hierarchical taxonomy of the plurality of items, wherein receiving the information comprises: selecting the plurality of items based on a brand of each item, and wherein the plurality of items is included in a catalog of items associated with the brand;

receiving information identifying a retailer associated with each of the plurality of brands, wherein at least one item of the plurality of items is included among an inventory of the retailer;

dynamically generating brand pages for the plurality of brands based on the received information and displaying the dynamically generated brand pages on client devices associated with users, comprising:

applying a machine learning model to a first set of attributes associated with each item included among the inventory of the retailer to predict an availability of each item at one or more retailer locations associated with the retailer, wherein the machine learning model comprises a set of parameters that transform an input to the machine learning model to an output, and the machine learning model is trained by:

receiving a set of training examples, each training example including a label indicating whether an item was available at a retailer location and a set of attributes of the item, updating the machine learning model by applying the machine learning model to each training example, comparing an output from the machine learning model to the label of the training example to compute a loss score which indicates a difference between the output and the label, computing, based on the loss score, gradients of the set of parameters, and modifying the set of parameters of the machine learning model by combining the computed gradients of the parameters with current values of the parameters of the machine learning model;

identifying a set of items from the plurality of items, wherein the set of items is associated with at least a threshold predicted availability at the one or more retailer locations associated with the retailer;

grouping the set of items into one or more item categories based at least in part on the hierarchical taxonomy of the plurality of items;

for each item category of the one or more item categories:

computing an item score for each item included in a corresponding item category of a particular brand based at least in part on one or more of: a measure of popularity of a corresponding item among a plurality of users of the online system, the first set of attributes associated with the corresponding item, and a second set of attributes associated with a user of the online system, assigning one or more items included in the corresponding item category to one or more item positions within a display unit associated with the corresponding item category based at least in part on the item score computed for each item, and computing a category score for the corresponding item category of the particular brand based at least in part on the item score computed for each item;

assigning one or more display units associated with the one or more item categories to one or more category positions within a template maintained by the online system based at least in part on the category score computed for each item category;

generating a brand page associated with the particular brand and the retailer based at least in part on the one or more display units assigned to the one or more category positions within the template and the one or more items assigned to the one or more item positions; and transmitting the brand page to a client device associated with a user, causing the brand page to be displayed on the client device associated with the user;

in response to receiving updated information identifying the plurality of items associated with the brand or updated retailer inventory information,
reapplying the machine learning model to the updated information to generate updated predicted availability scores for the items;
dynamically regenerating the brand page based at least in part on the updated predicted availability scores, wherein the updated brand page updates item positions within a display unit based on the updated predicted availability scores, such that an item with an increased predicted availability score is arranged in a more prominent position of the brand page over an item with a decreased predicted availability score that was previously displayed in the brand page; and transmitting the updated brand page to the client device associated with the user, causing the updated brand page to be displayed on the client device associated with the user.

* * * * *